Patented June 12, 1945

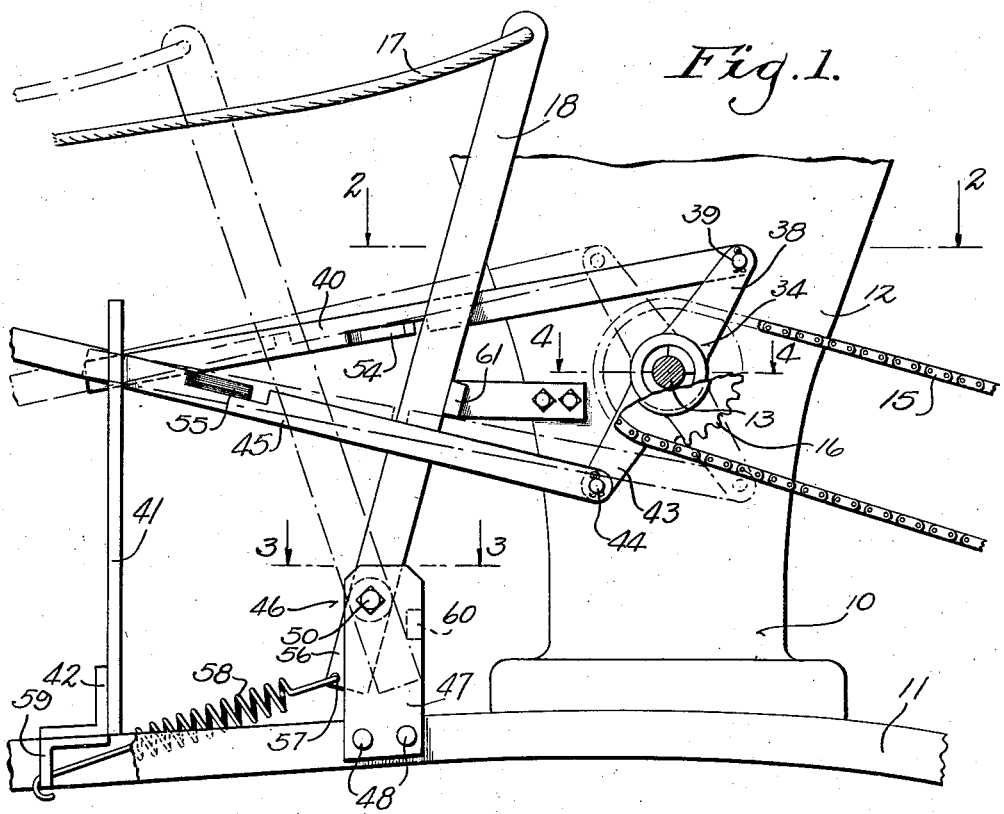
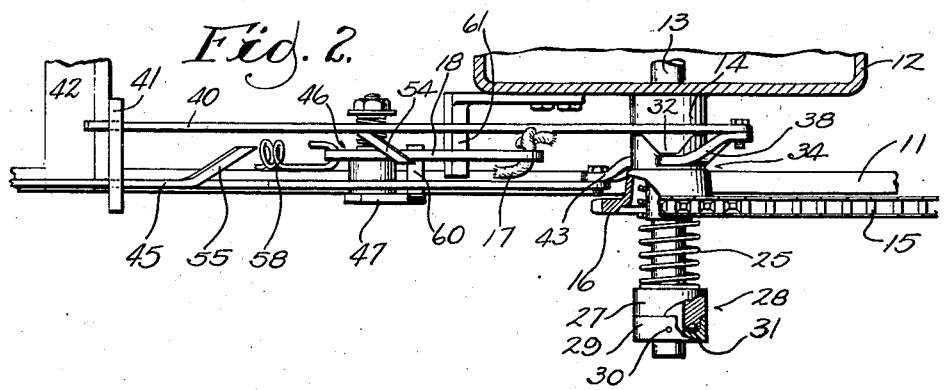
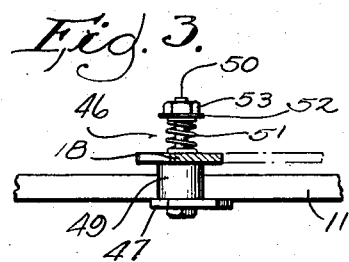

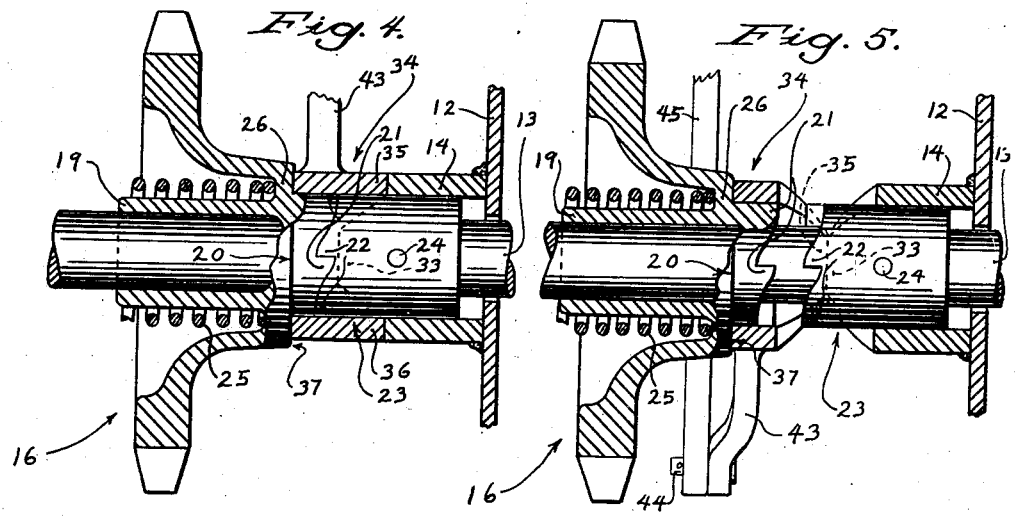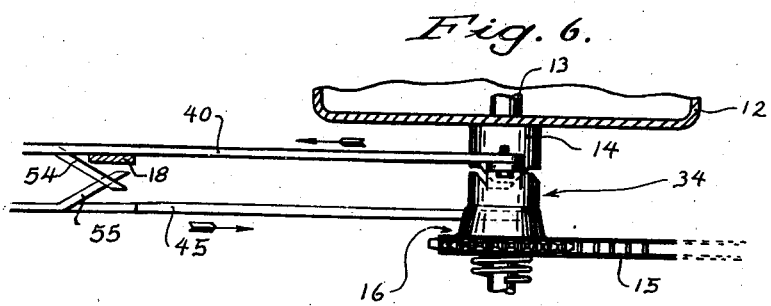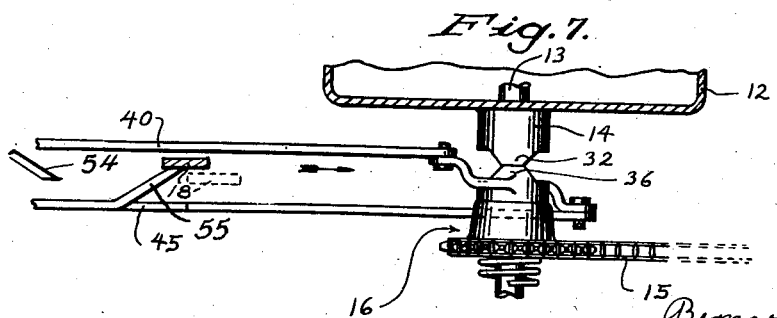

2,378,330

UNITED STATES PATENT OFFICE 2,378,330

ACTUATING MECHANISM

Bernard J. Schill and Harry R. Traphagen, Rockford, Ill., assignors to J. I. Case Company, Racine, Wis., a corporation Application March 13, 1942, Serial No. 434,470

3 Claims. (Cl. 192—92)

The present invention relates to control means and more particularly to such means adapted to control a clutch.

More particularly the invention relates to such a control means and clutch as will be suitable for use on a machine such as a grain drill or similar agricultural implement and an object thereof is to generally improve the construction and operation of devices of this class. More particularly an object is to provide a control means whereby a simple connection such as a trip rope or the like will operate to start certain mechanism upon one actuation and to stop the mechanism on the next actuation. A further object is to provide such a construction which may be very inexpensively manufactured and which will be extremely reliable under the adverse conditions and treatment to which such implements are subjected.

Further objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention as herein expressed.

In the annexed drawings

Figure 1 is an end elevation of a portion of a grain drill showing an illustrative embodiment of the invention.

Fig. 2 is a fragmentary sectional view taken on the line 2—2 of Fig. 1.

Fig. 3 is a similar view taken on the line 3—3 of Fig. 1.

Fig. 4 is an enlarged section of certain mechanism indicated in Fig. 1 taken partly on the line 4—4 of Fig. 1.

Fig. 5 is a similar view of the parts in a different position.

Fig. 6 is a view similar to Fig. 2 but indicating the parts in partly shifted position.

Fig. 7 is a similar view showing the parts after completion of the movement indicated in Fig. 6.

As indicated in Fig. 1, the illustrative embodiment of the invention applies to a grain drill generally designated as 10, only a portion of which is necessary to be shown. Grain drill 10 has a chassis frame member 11 on which is mounted a seed box 12 of the usual or suitable design. A shaft 13 is rotatably supported from a bearing 14 and serves to actuate any suitable type of seed dropping mechanism not necessary to be shown or described. Shaft 13 is rotated in the present instance from a chain 15 actuated in well-known manner and driving a sprocket generally designated as 16 supported on the shaft. Sprocket 16 may be connected in driving relation with shaft 13 or disconnected therefrom by actuation of a trip element or rope 17 connected with a lever 18 as will appear, successive actuation of member 17 alternately engaging and disengaging sprocket 16 from shaft 13.

Referring to Fig. 4, sprocket 16 has a bearing portion 19 slidably journaled on above mentioned shaft 13 and is also provided with a clutch element generally designated as 20, having teeth 21—21 engageable with teeth 22—22 on a clutch element generally designated as 23 fixed with shaft 13, as for example by a pin 24.

Clutch member 23 in the present instance is journaled in above mentioned bearing 14 which is fixed to or supported from above mentioned seed box 12. With clutch teeth 21 engaged with clutch teeth 22, a driving connection is accordingly established between sprocket 16 and shaft 13. On the other hand with teeth 21 separated from teeth 22, as indicated in Fig. 5, no driving connection is established and sprocket 16 runs idly on shaft 13.

Sprocket 16 is continuously urged to the right as seen in Figs. 4 and 5 by a spring 25 disposed about bearing portion 19 and compressed between a shoulder portion 26 of sprocket 16 and a collar 27 constituting part of a thrust bearing generally designated as 28, Fig. 2.

Thrust bearing 28 may be of any suitable type within the contemplation of the invention, in the present instance comprising above mentioned collar 27 and a second collar 29, fixed with shaft 13 as by a pin 30, collar 27 being journaled on shaft 13 and any suitable anti-friction expedient being interposed between the collars, in the present instance ball bearings 31. Thus when sprocket 16 is running idly, collar 27 may follow, being driven by spring 25 so that no undue damage or wear on the spring or its associated parts will occur. Spring 25 accordingly maintains clutch elements 20 and 23 engaged, unless prevented, as will appear.

Above mentioned bearing 14 is provided with cam portions 32 and 33 and a collar generally designated as 34 has cam portions 35 and 36 projecting therefrom between above mentioned cam portions 32 and 33, in one position of collar 34. Collar 34 engages a shoulder 37 on above mentioned sprocket 16 and is journaled on clutch members 20 and 23. Rotation of collar 34 will cause cam portions 35 and 36 to ride on cam portions 32 and 33, thus forcing collar 34 to the left as seen in Fig. 5. This will urge sprocket 16 also to the left, compressing spring 25 and separating clutch elements 20 and 23. Under these conditions, sprocket 16 will rotate idly on shaft 13 as above suggested.

Rotation of collar 34 in the present instance is effected as follows. The collar has an upwardly extending arm 38 pivoted at 39 to a forwardly extending slide rod 40 guided for rocking and sliding movement in a support 41 fastened to frame element 11 as for example by an angle iron 42. Collar 34 also has a downwardly extending arm 43 pivoted at 44 to a second slide rod 45 also slidable in support 41 but spaced from rod 40 as seen in Figs. 2, 6 and 7. Between rods 40 and 45 is disposed above mentioned lever 18 fulcrumed at 46 to a plate or the like 47 fixed by means of rivets or the like 48 to above mentioned frame element 11.

Fulcrum 46, as more particularly indicated in Fig. 3, provides for rocking of lever 18 in various directions. Thus, plate 47 carries a hub or support 49 in which is fixed a bolt or pin 50. Lever 18 in the present instance is loosely journaled on bolt 50 and yieldably pressed against hub 49 by a spring 51. Spring 51 is compressed between lever 18 and a washer or the like 52 in the present instance by a nut 53. Lever 18 will accordingly swing in a path determined by its engagement with hub 49, but may be diverted from said path by any lateral force sufficient to cause further compression of spring 51.

Rod 40, Fig. 2, has a finger 54 in the present instance inclined inwardly toward rod 45 in the path of swinging movement of lever 18. Finger 54 clears the plane of rod 45 sufficiently to provide room for lever 18 to pass between finger 54 and rod 45. In similar manner rod 45 has a finger 55 inclined toward rod 40. Finger 55 would also be in the path of lever 18 if the latter were not intercepted by above mentioned finger 54. Again finger 55 clears the plane of rod 40 sufficiently to provide passage for lever 18.

Referring now to Figs. 2, 6 and 7, actuation of trip member 17 initiates movement of lever 18 to the left as seen in Fig. 2. Lever 18 almost immediately encounters finger 54. Owing to the inclination of finger 54, lever 18 is forced to one side toward and into contact with rod 40 as indicated in Fig. 6. Further movement of lever 18, through engagement with finger 54, moves rod 40 to the left thus rocking collar 34 and urging the parts toward the position shown in Fig. 5. Rocking of collar 34 causes movement toward the right of rod 45, as will be apparent, but owing to the position of lever 18, finger 55 does not interfere with movement of lever 18, the two missing each other as clearly indicated in Fig. 6. Continued movement of lever 18 brings the parts to the extent of their movement, whereupon cam portion 36 will be in engagement with cam portion 32 and clutch elements 20 and 23 will be disengaged as seen in Fig. 5.

Lever 18, as indicated in Fig. 1, has an arm 56 extending below fulcrum 46 and to which is pivoted at 57 a spring 58 anchored on a member 59 fixed with above mentioned frame member 11 and any suitable stop means such as a tongue 60 carried by plate 47 limits the movement of lever 18 to that extent.

Release of trip means 17 therefore allows lever 18 to return toward the right as seen in Fig. 7, the lever encountering finger 55 on its return movement. Due to the inclination of finger 55 however, lever 18 is readily forced to one side and passes the finger as seen in Fig. 7. The lever comes to rest in the dotted position indicated in Fig. 7 where it remains until the next actuation of trip means 17. In this position it rests against a stop element of any suitable type 61.

Upon the next actuation of trip means 17, lever 18 will again move to the left but this time will encounter finger 55 as clear from Fig. 7. An exactly similar series of operations then takes place, lever 18 moving rod 45 to the left and passing finger 54 by virtue of contact of the lever with rod 45. This rocks collar 34 in a clockwise direction as seen in Fig. 1, moving cam portion 36 back toward the position indicated in Fig. 2. This position is achieved when arm 56 encounters tongue 60 and the clutch parts are restored to the position shown in Fig. 4. Release of trip member 17 restores lever 18 to the position shown in Fig. 2 with clutch elements 20 and 23 engaged.

It will thus be apparent that a clutch actuating device has been provided which will alternately engage and disengage the drive mechanism to a seeding device upon successive manipulations of a trip member.

The above being a complete description of an illustrative embodiment of the invention what is claimed as new and desired to be secured by Letters Patent of the United States is:

1. In a clutch for a grain drill, interengageable clutch elements, mechanism for engaging and disengaging said clutch elements, and mechanism for actuating said engaging mechanism including spaced interconnected oppositely movable slide rods, a lever between said rods and transverse thereof, trip means for rocking the lever at will, said lever being adapted to rock both in the direction of the rods and also transversely thereof, a finger on each rod and extending toward the other rod and into the path of said lever when said lever is actuated by said trip means, and each of said fingers being so inclined relatively to the direction of movement of said lever induced by said trip means as to swing said lever transversely of said direction out of the path of the other finger, and movement of said lever actuating said rod through said finger for actuating said clutch engaging and disengaging mechanism and retracting the other rod.

2. In a grain drill the combination of a drive shaft for a seed dropping mechanism, a jaw clutch element on the shaft, a bearing disposed about the shaft and in which said clutch element is journaled, a cam portion on said bearing, a collar journaled on said jaw clutch and having a cam portion engaged with the cam portion on said bearing, a driving element journaled on said shaft and having a clutch element engageable with the clutch element aforesaid in one position of said driving element, means continuously urging said driving element in a direction to cause engagement of said clutch elements, an arm extending upwardly from said collar, a rod pivotally connected to said arm and extending laterally thereof, a second arm extending downwardly from said collar, a second rod pivotally connected to the second arm and extending laterally thereof generally in the same direction as the first mentioned rod, but spaced therefrom, a lever between the rods and transverse thereof, a trip rope extending from the lever, a finger on each rod and extending toward the other rod and into the path of said lever when said lever is actuated by said trip rope, and each of said fingers being so shaped as to swing said lever to one side out of the path of the other finger when said lever engages said finger for actuating said rod for rocking said collar for shifting said clutch.

3. In a seeding control the combination of a trip member, a clutch having driving and driven elements, a shiftable element having a plurality of positions, one of said positions adapted to place said clutch elements in driving relation and another position adapted to place said elements in disengaged relation, an actuating element connected with said trip member and connections from said actuating element to said shiftable element adapted upon one actuation of said trip member to move said shiftable element to one of said positions for engagement of said clutch elements, and upon another actuation of said member to move said shiftable element to another of said positions for disengagement of said clutch elements.

BERNARD J. SCHILL.
HARRY R. TRAPHAGEN.